(12) United States Patent
Vija et al.

(10) Patent No.: US 8,014,580 B2
(45) Date of Patent: Sep. 6, 2011

(54) DETERMINING A PIXON MAP FOR IMAGE RECONSTRUCTION

(75) Inventors: A. Hans Vija, Evanston, IL (US); Amos Yahil, Stony Brook, NY (US)

(73) Assignee: Siemens Medical Solution USA, Inc., Malvern, PA (US)

(*) Notice: Subject to any disclaimer, the term of this patent is extended or adjusted under 35 U.S.C. 154(b) by 979 days.

(21) Appl. No.: 11/931,030

(22) Filed: Oct. 31, 2007

(65) Prior Publication Data

US 2009/0110321 A1    Apr. 30, 2009

(51) Int. Cl.
*G06K 9/00* (2006.01)
(52) U.S. Cl. ............................................ 382/128; 378/4
(58) Field of Classification Search .................. 382/100, 382/128, 129, 130, 131, 132; 128/922; 378/4–27
See application file for complete search history.

(56) References Cited

U.S. PATENT DOCUMENTS

| | | | | |
|---|---|---|---|---|
| 5,912,993 | A * | 6/1999 | Puetter et al. | 382/275 |
| 6,353,688 | B1 * | 3/2002 | Puetter et al. | 382/265 |
| 6,490,374 | B2 * | 12/2002 | Puetter et al. | 382/265 |
| 6,895,125 | B2 * | 5/2005 | Puetter et al. | 382/265 |
| 2008/0233546 | A1 * | 9/2008 | Baker et al. | 434/169 |
| 2008/0270465 | A1 * | 10/2008 | Vija et al. | 707/103 Y |

* cited by examiner

*Primary Examiner* — Anand Bhatnagar
(74) *Attorney, Agent, or Firm* — Peter Kendall

(57) ABSTRACT

Determining a pixon map for pixon smoothing of an object based on a data set includes receiving the data set and an input object associated to the data set. Determining a pixon map further includes determining, in a series of steps, statistical objects for a set of pixon kernel functions, wherein each step includes selecting a pixon kernel function from the set of pixon kernel functions, smoothing the input object on the basis of the selected pixon kernel function, thereby creating a smoothed object, and determining the statistical object for the selected pixon kernel function on the basis of the smoothed object, the data set, and a Mighell-like statistical weight. Determining a pixon map further includes determining contributions of the pixon kernel functions to the pixon map based on the statistical objects and assigning values to the pixon map corresponding to the contributions of the pixon kernel functions.

25 Claims, 12 Drawing Sheets

DETERMINING A PIXON MAP FOR IMAGE RECONSTRUCTION

TECHNICAL FIELD

An embodiment of the invention relates to image reconstruction, and in particular, to image reconstruction using a pixon method.

BACKGROUND

An overview of different reconstruction methods including a pixon method is given in R. C. Puetter et al., "Digital Image Reconstruction: Deblurring and Denoising," Annu. Rev. Astro. Astrophys., 2005, 43: 139-194; the pixon method is described in R. C. Puetter et al., "The pixon method of image reconstruction," Astronomical Data Analysis Software and Systems VIII., edited by D. M. Mehringer, R. L,. Plante D. A. Roberts, Astronomical Society of the Pacific, San Francisco, ASP Conference Series 1999, 172, 307-316, the contents of which are herein incorporated by reference. An application of the pixon method to medical planar imaging is discussed in C. A. Wesolowski et al., "Improved lesion detection from spatially adaptive, minimally complex, Pixon® reconstruction of planar scintigraphic images", Comput. Med. Imaging Graph., 2005, 29, 65-81, the contents of which are herein incorporated by reference.

SUMMARY

An embodiment of the invention is based in part on the recognition that a Mighell-like statistical weight is an appropriate weight for evaluating low count data as in nuclear imaging.

In an aspect, determining a pixon map for pixon smoothing of an object based on a data set includes receiving the data set and an input object associated to the data set. Determining a pixon map further includes determining, in a series of steps, statistical objects for a set of pixon kernel functions, wherein each step includes selecting a pixon kernel function from the set of pixon kernel functions, smoothing the input object on the basis of the selected pixon kernel function, thereby creating a smoothed object, and determining the statistical object for the selected pixon kernel function on the basis of the smoothed object, the data set, and a Mighell-like statistical weight. Determining a pixon map further includes determining contributions of the pixon kernel functions to the pixon map based on the statistical objects and assigning values to the pixon map corresponding to the contributions of the pixon kernel functions.

In another aspect, determining a pixon map entry for a first pixon kernel function of a set of pixon kernel functions having different sizes includes receiving a data set; receiving an input object associated to the data; smoothing the input object based on the first pixon kernel function, thereby creating a smoothed object; determining a delta object by subtracting the input object from the smoothed object; determining a delta data model by projecting the delta object from object space into data space; determining statistical data factors by evaluating the delta data model using the data and a Mighell-like statistical weight; determining statistical object factors by back-projecting the statistical data factors from data space into object space; multiplying the entries of the delta object by the corresponding statistical object factors, thereby creating a statistical object; determining an object point for which a value of the statistical object at the object point has transitioned from being outside the limitation of a pre-set cut-off value to being inside the limitation; selecting the next smaller pixon kernel function compared to the first pixon kernel function to contribute to an entry of the pixon map corresponding to the object point.

In another aspect, a nuclear imaging device includes a detector unit for detecting radiation emitted from within a patient and providing a data set indicative of the detected radiation, a pixon map construction unit for creating a pixon map based on a set of pixon kernel functions and a Mighell-like statistical weight, and a pixon reconstruction unit for reconstructing an image using a pixon smoothing operation based on the pixon map.

Implementations may include one or more of the following features. The statistical objects may be further determined on the basis of the input object.

Determining the contributions of the pixon kernel functions may include determining a first pixon kernel function for an object point of the input object, the first pixon kernel function being the broadest pixon kernel function available in the set of pixon kernel functions for which a value of the statistical object at the object point is inside the limitation of a pre-set cut-off.

One of the values of the pixon map corresponding to the object point may include a contribution of the first pixon kernel function to the pixon smoothing of that object point.

Determining the contributions of the pixon kernel functions may include determining a second pixon kernel function for the object point, the second pixon kernel function being the narrowest pixon kernel function from the set of pixon kernel functions for which the value of the statistical object at the object point is outside the limitation of a pre-set cut-off value.

One of the values of the pixon map may be based on contributions of the first and second pixon kernel functions such that pixon smoothing of an object point with the first pixon kernel function and with the second pixon kernel function and adding the resulting smoothed values according to the contributions may correspond to a pixon smoothing operation with a determinable statistical object value equal to the pre-set cut-off value.

Determining statistical objects may further include determining a delta object by subtracting the input object from the smoothed object; determining a delta data model by projecting the delta object from object space into data space; determining statistical data factors by evaluating the delta data model using the data set and the Mighell-like statistical weight; determining statistical object factors by back-projecting the statistical data factors from data space into object space; and determining the statistical object by multiplying the entries of the delta object by the corresponding statistical object factors.

Determining statistical data factors may include setting the sum of the value of the data set at the data point and a statistical-data-offset number as Mighell-like statistical weight and dividing a value of the delta data model at one of the data points of the data set by the sum of the value of the data set at the data point and a statistical-data-offset number. The statistical-data-offset number may be selected to be a number between 0 and 10.

Determining statistical data factors may include determining that the measured value of a data set is above a threshold and determining the associated statistical data factor by evaluating the delta data model using the data set and the Mighell-like statistical weight.

Determining statistical data factors may include determining that the measured value of a data set is below a threshold and setting the associated statistical data factor to a pre-set value.

Determining statistical objects further includes smoothing the statistical object factors on the basis of the selected pixon kernel function before the multiplication with the delta object.

During the series of steps, pixon kernel functions may be selected in order of increasing sizes.

Pixon kernel functions may be selected from the group consisting of symmetrical, spherical, elliptical pixon kernel functions, delta-functions, a Gaussian function, an inverted paraboloid, and a function $f(x;\beta)=(1+\beta x^2)^{-1/\beta^2}$.

Determining the pixon map may further include determining the statistical object on the basis of a chi-square-gamma statistic.

Determining the pixon map may further include fitting the input object to the data using a reconstruction algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

Determining the pixon map may further include receiving the data set from a nuclear imaging system.

The pixon map construction unit of the nuclear imaging device may be further configured to analyze an effect of pixon smoothing with a pixon kernel function on an input object by determining a statistical object based on the smoothed object and the Mighell-like statistical weight.

The pixon map construction unit of nuclear imaging device may be further configured for determining a delta object by subtracting the input object from the smoothed object; determining a delta data model by projecting the delta object from object space into data space; determining statistical data factors by evaluating the delta data model using the data set and the Mighell-like statistical weight; determining statistical object factors by back-projecting the statistical data factors from data space into object space; determining the statistical object by multiplying the entries of the delta object by the corresponding statistical object factors.

The detector unit of the nuclear imaging device may include a positron emission tomography detector system and/or a single photon computed tomography detector system.

The pixon reconstruction unit of the nuclear imaging device may be configured to run an algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

These general and specific aspects may be implemented using a system, a method, a computer readable medium, or a computer program, or any combination of systems, methods, a computer readable medium, or a computer programs.

Certain implementations may have one or more of the following advantages. The pixon map has a high accuracy. The pixon map can be determined for two, three, or more dimensional objects. The map determination may be executed by using existing reconstruction architectures, such as an OSEM architecture.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
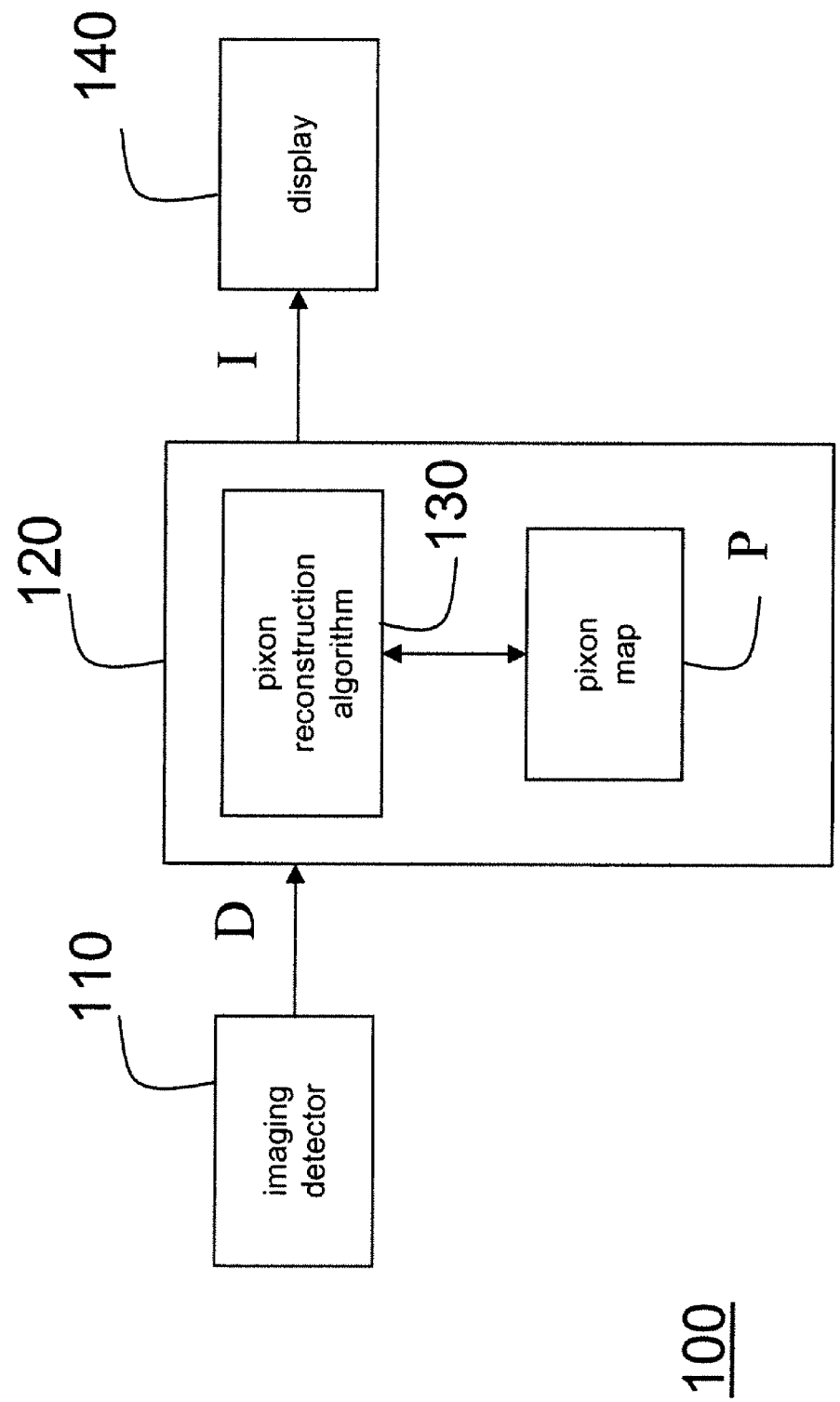
FIG. 1 is an overview of a nuclear imaging system.

FIG. 1 shows a nuclear imaging system 100 with an imaging detector 110, and a pixon reconstruction unit 120. The three-dimensional (3D) reconstruction is based on a pixon method that uses a pixon map P, which interacts with a pixon reconstruction algorithm 130. The pixon method refers to a method that smoothes each point in object space (hereafter an "object point") by assigning a shape or volume to each object point as a basis for the pixon smoothing. The object space is the space in which the result of the image reconstruction is defined and which corresponds to the 3D volume that was imaged using the nuclear imaging system 100. A corresponding data space is given by the data points measured with the imaging detector 110.

Within this application, "pixon" is used to indicate that a term, method, object etc. refers to the pixon method, i.e., to the use of object point specific shapes (areas or volumes) when smoothing an image object. For example, the assigned shapes are defined by pixon kernel functions, and the pixon map P stores the information about which of the pixon kernel functions is/are assigned to each object point.

The pixon method provides high quality reconstruction of a 3D image object I in object space from a measured data set D in data space. As a spatially adaptive reconstruction method, the pixon method applies a data-motivated smoothing operation to every object point. In doing so, the pixon method uses the principal of minimum complexity when assigning to every object point a pixon kernel function, which is the basis for the smoothing operation. Within the pixon reconstruction unit 120, the pixon map P defines which of the pixon kernel functions is assigned to each of the object points.

The pixon method is especially suited for reconstructing an object from a measured data set with a low number of counts and an unavoidable noise contribution. Such data sets are produced, for example, with medical imaging techniques in nuclear medicine, which produce 3D images of, for example, a functional process in a patient's body by using nuclear properties of matter. Examples of such imaging techniques are Positron Emission Tomography (PET) and Single Photon Computed Tomography (SPECT). For these types of nuclear imaging, one administers a radioactive substance to the patient and detects emitted radiation with a detector system, e.g., with a ring detector for PET or with one or several gamma cameras for SPECT.

In the nuclear imaging system 100, the imaging detector 110 detects γ-radiation emitted from the patient. To detect the small amount of emitted γ-radiation, the imaging detector 110 is positioned around or partly around the patient and could be, for example, a conventional SPECT or PET detector system. The imaging detector 110 provides the measured data set D to the pixon reconstruction unit 120. The pixon reconstruction unit 120 uses the especially adapted pixon reconstruction algorithms 130 to tomographically reconstruct the acquired data set D into the 3D image object I. In doing so, the pixon reconstruction algorithm 130 uses a system matrix H to describe the properties of the nuclear imaging system 100, and to estimate an iteratively improved image object by adjusting the data model, which is the basis for the 3D image object I. The 3D image object I is, for example, displayed on a display 140 using well-known volume rendering techniques.

The pixon map P provides, for every object point, a pixon kernel function that is determined on the basis of a minimum complexity method. This pixon kernel function is used in a pixon smoothing operation applied in object space. Several examples of reconstruction algorithms using the pixon method are described with reference to FIGS. 7 to 12. FIGS. 2 to 6 illustrate an exemplary determination of a pixon map P for the case of nuclear count data having a random Poisson distribution.

Reconstruction Algorithm

Iterative image reconstruction methods, such as maximum likelihood, non-negative least square, or OSEM algorithms, iteratively fit image models to measured data and thus minimize the effect of noise on the final image. The result of a reconstruction algorithm is an approximated image that is fit to the measured data set D according to the rules of the algorithm. Examples of an reconstruction algorithm include algorithms based on maximum likelihood, algorithms based on an ordered subset expectation maximization, algorithms based on a non-negative least square fit, and algorithms based on an ordered subset non-negative least square fit. Details of an algorithm based on a non-negative least square fit are disclosed in the co-pending U.S. patent application entitled "NNLS image reconstruction," by A. Yahil and H. Vija, filed on even date herewith, the contents of which are herein incorporated by reference. In the pixon method, such an approximated image can be used as an input object for pixon smoothing (see FIG. 7), for pixon reconstruction (see FIGS. 9-11), and for the determination of the pixon map.

Pixon Map Determination

The pixon method includes a search for the broadest possible pixon kernel functions at each point in object space that together support an adequate fit of an object to the measured data set D. In particular, the pixon map assigns to each object point a specific pixon kernel function. During a pixon smoothing operation, the selected pixon kernel functions are obtained from the values of the pixon map P. When applying the pixon method to data consisting of low numbers of counts, a statistic is used to statistically evaluate the effect of smoothing with a pixon kernel function during the determination of the pixon map P. Thus, such a statistical evaluation is suitable, for example, for image reconstruction in the nuclear imaging system 100, for which the data are Poisson distributed. Employing a statistical evaluation for the pixon map determination that coincides with a statistic of the data set D increases the accuracy of the pixon map P.

One constructs the pixon map P by iteratively considering each of the pixon kernel functions individually (see FIGS. 2 to 6). Within each iteration, one calculates a goodness-of-fit for every object point of a 3D input object ψ, and evaluates the extent of the smoothing caused by the pixon kernel function associated with that iteration. The goodness-of-fit is based on a statistic that is well suited for low count data. If the calculated goodness-of-fit of an object point fulfills a preset condition, one (or more) pixon kernel functions are assigned to that object point. The information about the assigned kernel function(s) is stored in the pixon map P.

Figure 2:
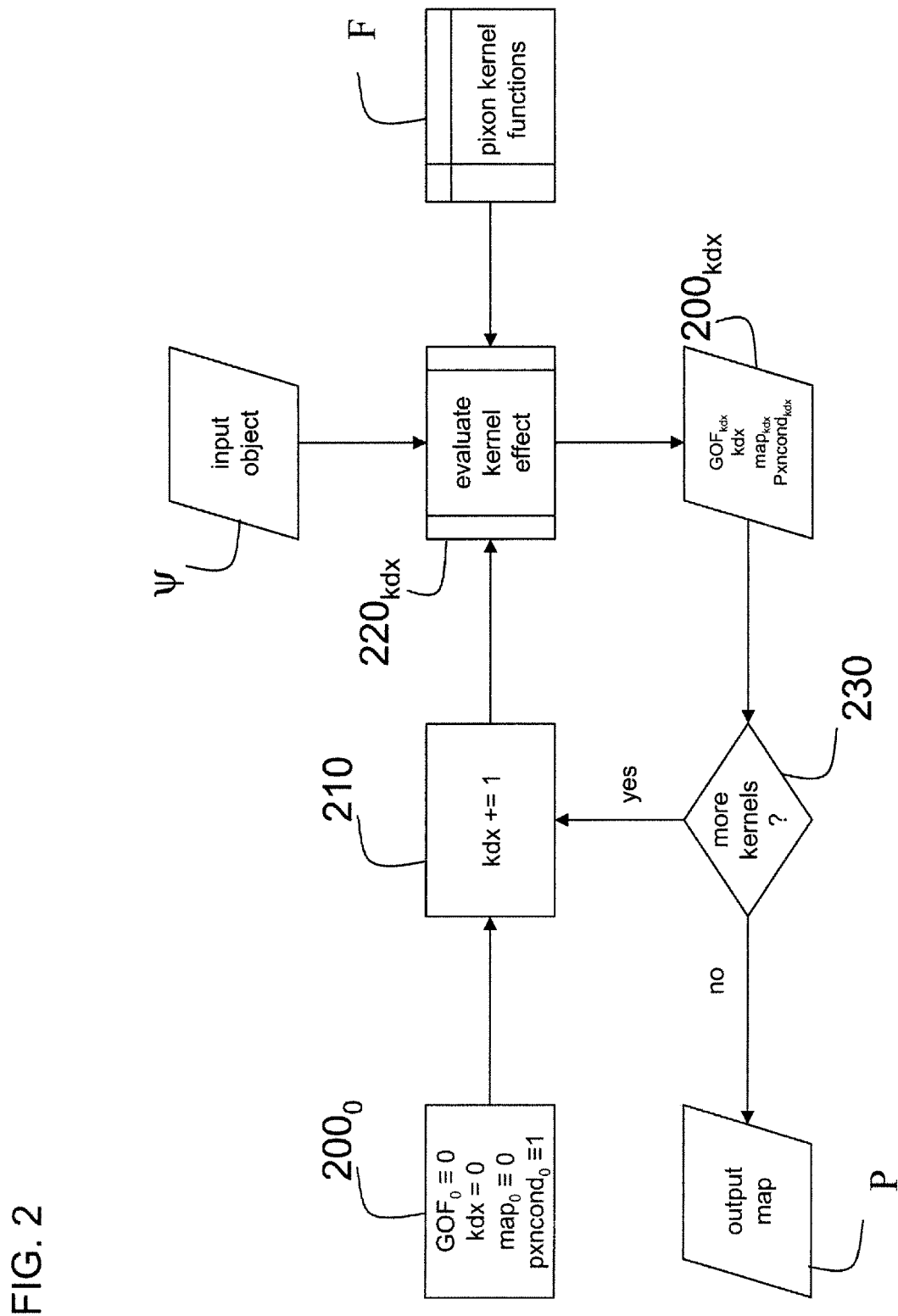
FIG. 2 is a flowchart of an exemplary iterative concept for constructing a pixon map.

FIG. 2 shows an iteration process for constructing a pixon map P during which each iteration introduces a broader kernel function. To start the process, one sets a goodness-of-fit field, GOF, a pixon map field, map, and a condition field, pxncond, to their respective initial values, e.g., to zero or one (step $200_0$). The GOF-field and the map-field record the currently calculated goodness-of-fit values and the assigned pixon kernel functions for each object point, respectively. The pxncond-field indicates for which of the object points an additional broadening of the pixon kernel function might be possible. Thus, as long as a GOF-value for an object point is within a predetermined limitation, the value of the condition field, pxncond, corresponding to that object point is set to one and the extent of the smoothing caused by a broader pixon kernel function is tested. Otherwise, the value of the pxncond-field is set to zero.

The available pixon kernel functions are maintained in a pixon kernel function table F. These functions are indexed by a kernel pointer kdx, the value of which points to the particular pixon kernel function to be used in the current iteration. The value of the kernel pointer kdx is initially set to zero and incremented (step 210) with each iteration to indicate which of the available pixon kernel functions from the pixon kernel function table F is to be evaluated (step $220_{kdx}$) during that iteration.

Following the evaluation of the effect of the pixon kernel function identified by the kernel pointer kdx to an input object ψ, the goodness-of-fit field, GOF, the pixon map field, map, and the condition field, pxncond, are all updated as needed (step $200_{kdx}$).

The algorithm then determines whether another kernel function should be evaluated (step 230). If so, the kernel pointer kdx is increased (step 210). The newly indicated pixon kernel function and the updated fields are then used as input parameters for the next evaluation (step $220_{kdx+1}$). If all required pixon kernel functions have been evaluated, the pixon map construction is completed and a pixon map P is provided, for example, to the pixon reconstruction unit 120.

Figure 3:
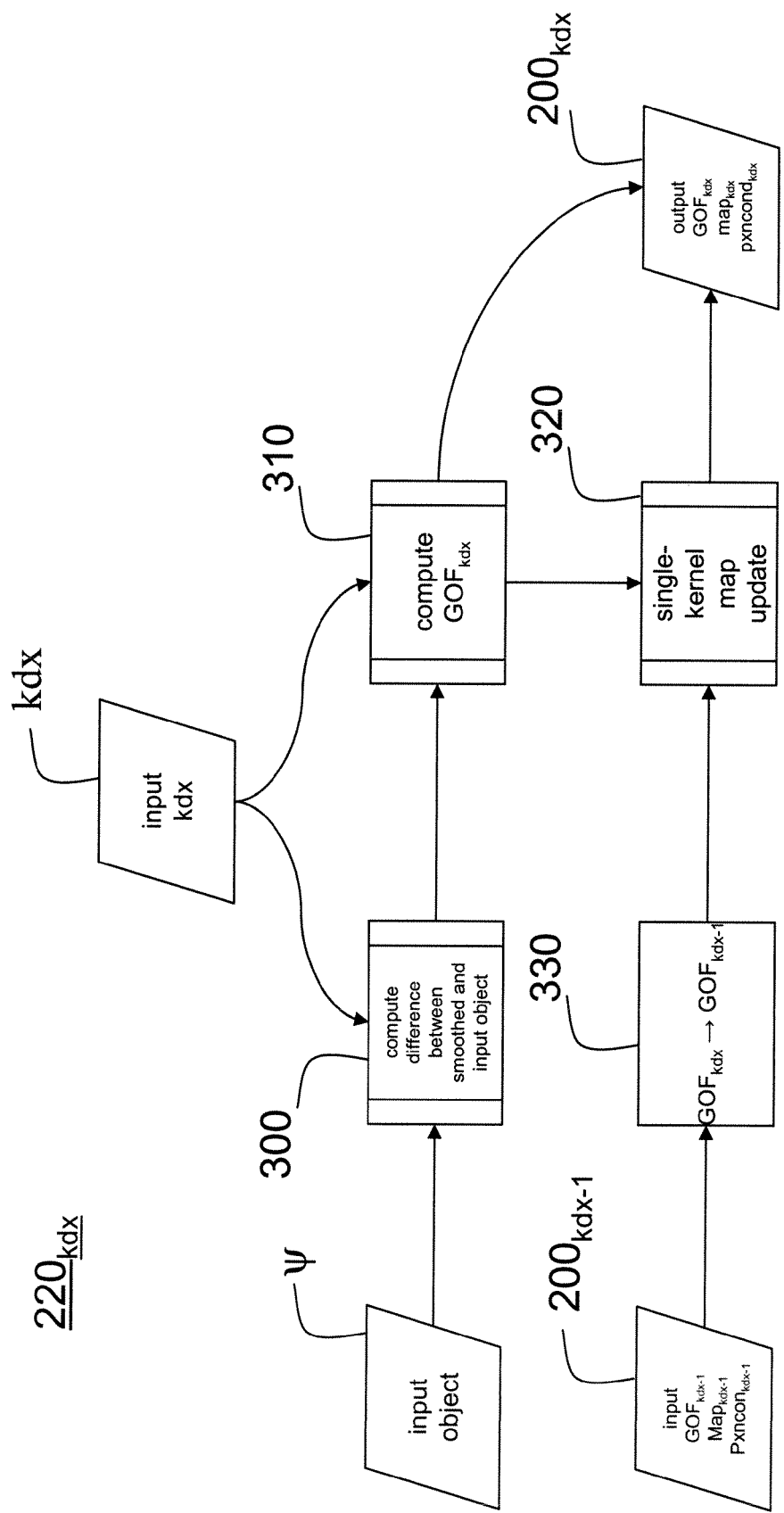
FIG. 3 is a flowchart of an exemplary evaluation of a kernel function.

FIG. 3 illustrates the evaluation (step $220_{kdx}$) of the smoothing effect of a pixon kernel function on the 3D input object. The 3D input object is an initial estimate of the image object which is, for example, determined using a conventional image reconstruction method. For the evaluation of the smoothing effect, one smoothes the 3D input object ψ and statistically evaluates the difference object between the 3D input object ψ and a smoothed object (step 300). Then, one computes a goodness-of-fit value for each of the entries of the difference object (step 310). The details associated with the calculation of the difference (step 300), and the calculation of a goodness-of-fit value (step 310) are shown in FIGS. 4 and 5, respectively.

Figure 7:
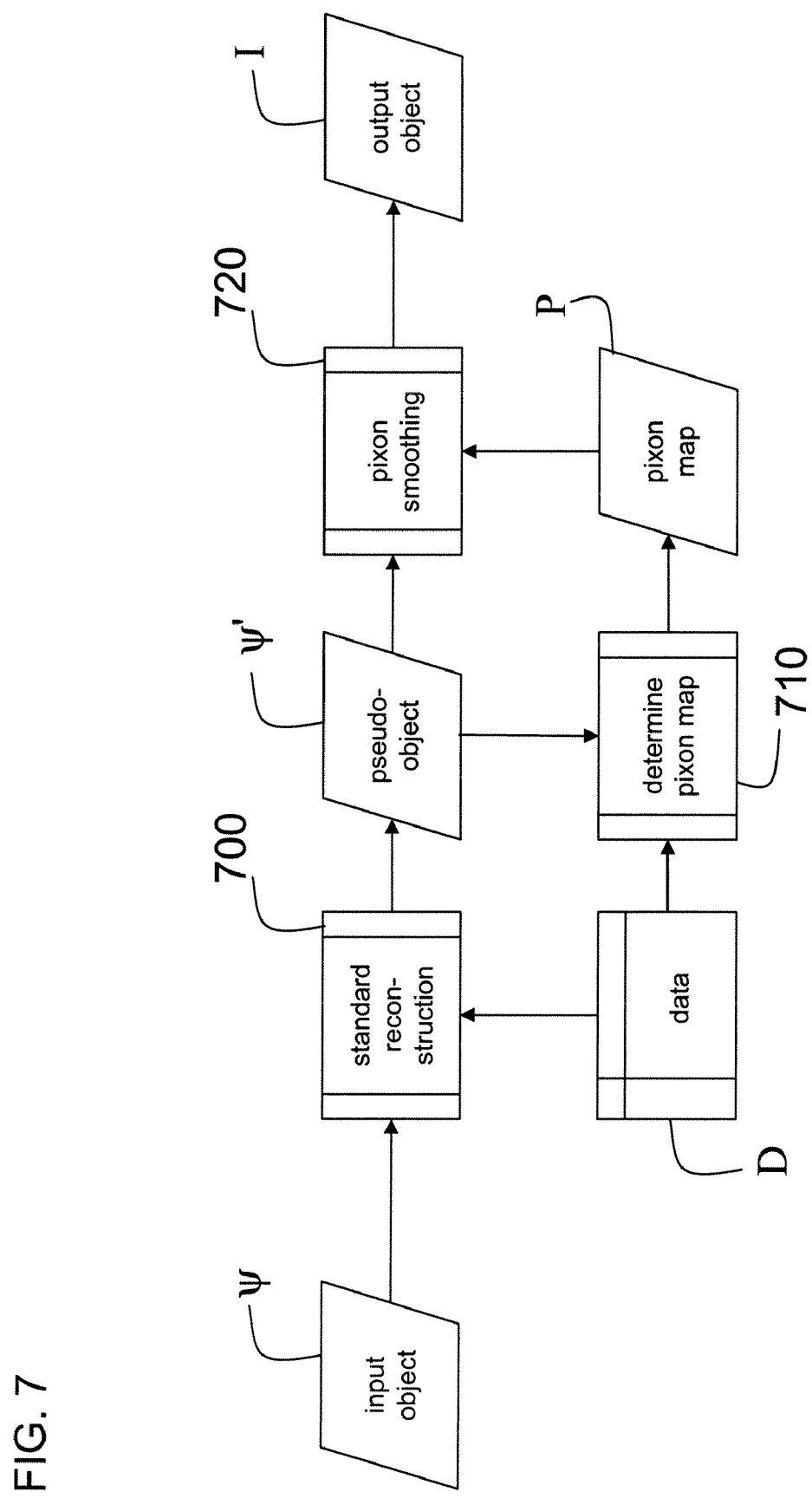
FIG. 7 is a flowchart illustrating an example of image reconstruction using pixon smoothing.

When a GOF-value fulfills a specified requirement, for example, when it passes a cut-off, one updates the corresponding pixon map entries. Such a single-kernel map update (step 320), the details of which are shown in FIG. 7, uses updated fields $200_{kdx-1}$ of the previous iteration (or the initial fields $200_0$ for the first iteration). As the single-kernel map update may make use of the previous values $GOF_{kdx-1}$, one stores these values temporarily in a field oldGOF (step 330). The evaluation (step $220_{kdx}$) ultimately yields a set of updated fields $200_{kdx}$ as an output.

Figure 4:
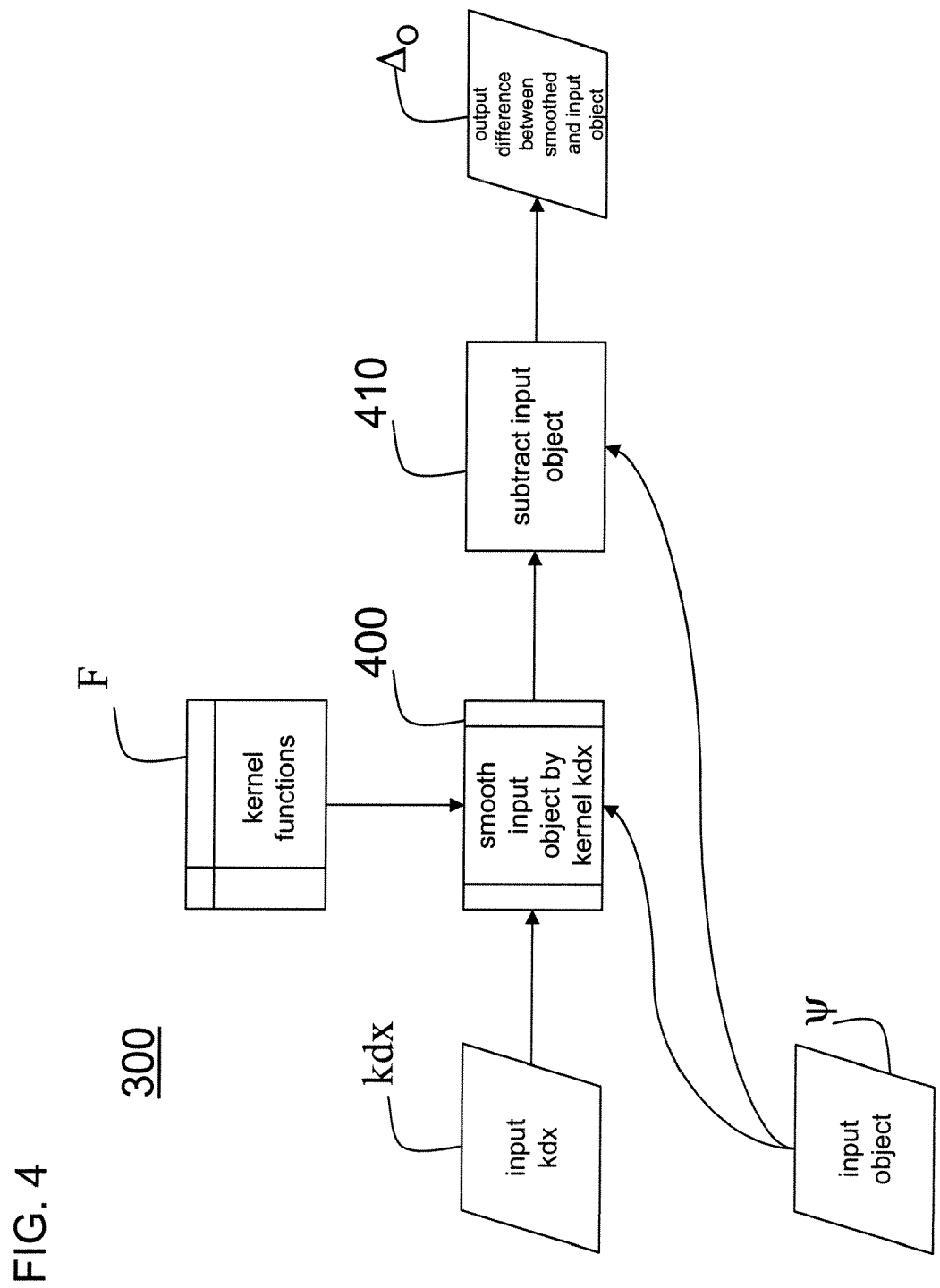
FIG. 4 is a flowchart of an exemplary calculation of a difference between a smoothed and unsmoothed object.
Figure 5:
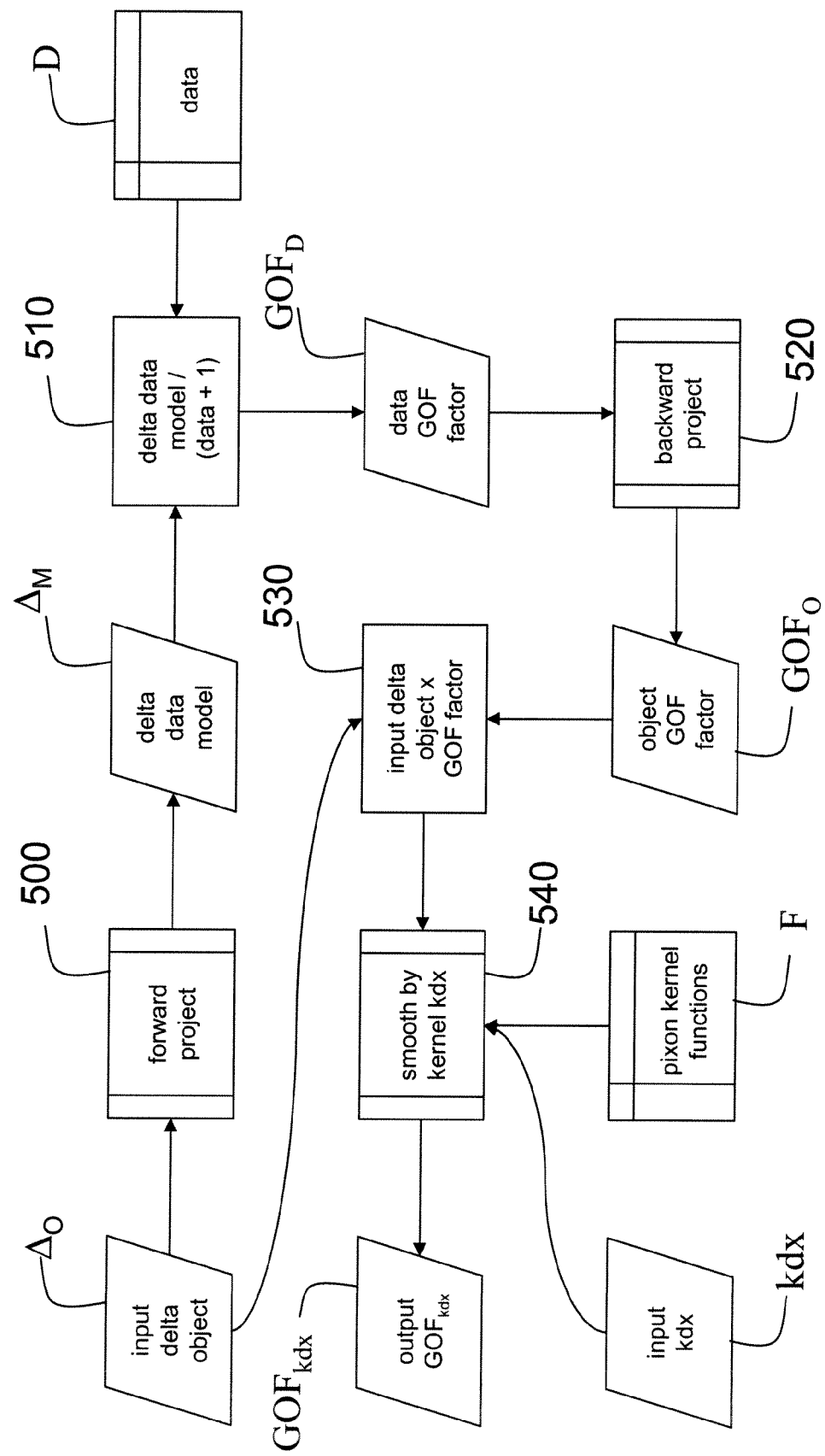
FIG. 5 is a flowchart of an exemplary calculation of a goodness-of-fit of the difference between a smoothed and unsmoothed object.

FIG. 4 shows the details associated with computing the difference between the 3D input object ψ and the smoothed object (step 300) referred to above in the discussion of FIG. 3. For the calculation of the difference in FIG. 4, the 3D input object ψ is smoothed over a single kernel function (step 400), to which the kernel pointer kdx of the current iteration points in the pixon kernel function table F. Within a particular iteration, each object point of the 3D input object ψ is smoothed with the same kernel function.

Pixon Smoothing Operation

Pixon smoothing can be viewed as averaging values of an object over a specific volume defined by the pixon kernel function. The smoothing operation can be written as a matrix operation using the pixon kernel operator K, such that the (smoothed) image object I is given by applying the pixon kernel operator K to a pseudo-image object ψ':

$$I_\alpha = \sum_\beta K_{\alpha\beta} \psi'_\beta$$

"Pseudo" indicates that the smoothing operation can be understood as a transformation (using the pixon kernel operator K) from a (pseudo-)object space, i.e. the pre-Pixon smoothing space, to the object space of the 3D image object I. Applying the transpose operator of the pixon kernel operator, $K^T$, then projects from the object space back into the pseudo-object space.

In many cases, the smoothing operation is a convolution operation given by:

$$I_\alpha = \sum_\beta K_{\alpha-\beta} \psi'_\beta$$

Convolutions can be calculated, for example, by a direct summation for small pixon kernel functions and by fast Fourier transforms (FFTs) for large kernel functions. If the kernel function can be factorized, a product of operators can be applied to simplify the calculation.

Kernel functions can be discrete or continuous. They are defined over a volume that surrounds an object point. The volume can be limited (over one or more object points) or extend over the complete object space. Examples for 2D or 3D pixon kernel functions include a Gaussian function, an inverted paraboloid, or a function $f(x; \beta)=(1+\beta x^2)^{-1/\beta^2}$, which approximates the Gaussian and parabolic functions for β-values of zero or infinity. The shapes of the kernel functions can be symmetric, or they can be adjusted in response to a form prevailing in the image object I. Within the shape of the pixon kernel functions, one can weigh the contribution of an object point. A limiting case of a pixon kernel function is the delta-function, in which the pixon smoothed object and the unsmoothed object are identical.

Referring again to FIG. 4, the 3D input object ψ is subtracted from the smoothed object (step 410) to create a delta object $\Delta_O$, which is defined in object space. The delta object $\Delta_O$ is an object, the entries of which correspond to the difference of two approximations of an image. Using the measured data set D of the nuclear imaging system 100, one can statistically evaluate the delta object $\Delta_O$. The evaluation is performed in data space.

Object Space and Data Space

Object space and data space are related to each other through the nuclear imaging system 100 by the system matrix H. A "forward projection" is an application of the system matrix H to an object in object space. The result of a forward projection is a "projected object" in data space. For example, projecting an estimated image into data space results in a data model M of that estimated image:

$$M_i = \sum_\alpha H_{i\alpha} I_\alpha$$

However, the system matrix H is rarely applied as a matrix multiplication. Instead, it is represented as a product of operators $H_n$:

$$H = H_n \otimes \ldots \otimes H_2 \otimes H_1$$

Corresponding to the forward projection, the backward projection from the data space into object space can be described as an application of the transpose $H^T$ of the system matrix H:

$$I_\alpha = \sum_i H_{\alpha i} M_i$$

The transpose $H^T$ is also rarely applied as a matrix multiplication. Instead, it is represented as a product of operators:

$$H^T = H_1^T \otimes H_2^T \otimes \ldots \otimes H_n^T$$

Evaluation of the Pixon Smoothing Operation

As discussed in connection with FIG. 3, FIG. 5 shows details associated with calculating goodness-of-fit values associated with the delta object $\Delta_D$ (step 310). Referring to FIG. 5, one projects the delta object $\Delta_D$ forward into data space (step 500) to form a delta data model $\Delta_M$, which is evaluated statistically (step 510). This evaluation is based on a point-wise comparison of each entry of the delta data model $\Delta_M$ with the measured data set D. The statistical evaluation considers the statistics of the data set D. For nuclear imaging data, one can assume Poisson statistics. An example of a statistical evaluation is derived from a chi-square-gamma statistic. An example of a chi-square-gamma statistic is described in K. J. Mighell, "Parameter estimation in astronomy with Poisson-distributed data. I. The $\chi_\gamma^2$ statistic," Astrophys. J., 1999, 518: 380-393 and K. J. Mighell, "Parameter estimation in astronomy with Poisson-distributed data. II. The modified chi-square gamma statistic", 2000, arXiv: astro-ph/0007328, the contents of which are herein incorporated by reference. However, in this application modifications of Mighell's statistical weight are also considered.

The chi-square-gamma statistic of Mighell is defined by:

$$\chi_\gamma^2 = \sum_{j=1}^{J} \frac{(d_j + \text{Min}\{d_j, 1\} - m_j)^2}{d_j + 1},$$

wherein $d_j$ and $m_j$ are the j-th entries of the measured data set D and the data model M, respectively. J is the number of data points in data space, i.e., the number of data in the data set D.

For a change in the data model ($m_j \rightarrow m_j + \Delta m_j$) and defining a residual $r_j = d_j + \text{Min}(d_j, 1) - m_j$, one can calculate $\chi_\gamma^2$:

$$\chi_\gamma^2(m_j + \Delta m_j) = \sum_{j=1}^{J} \frac{r_j^2}{d_j + 1} - 2 \sum_{j=1}^{J} \frac{\Delta m_j r_j}{d_j + 1} + \sum_{j=1}^{J} \frac{\Delta m_j^2}{d_j + 1}$$

The second term is negligible for fluctuating residuals and small changes. The third term is therefore the change $\Delta \chi_\gamma^2$ of the chi-square-gamma statistic. Using $$\Delta m_j = \sum_\alpha H_{j\alpha} \Delta I_\alpha,$$

the change $\Delta \chi_\gamma^2$ of the chi-square-gamma statistic can be rewritten using the system matrix H and its transpose $H^T$:

$$\Delta \chi_\gamma^2 = \sum_\alpha \Delta I_\alpha H^T \frac{1}{d+1} H \Delta I_\alpha$$

The projected delta object $H\Delta I$ corresponds to the delta data model $\Delta_M$ in data space. Thus the change $\Delta \chi_\gamma^2$ can be understood to include a statistical evaluation $\Delta_M/(d+1)$ for each data point in data space using a "Mighell statistical weight" $d+1$. In data space, one can therefore calculate goodness-of-fit factors $GOF_D$ by dividing each value of the delta data model $\Delta_M$ by the Mighell statistical weight, i.e. by the sum of the corresponding value of the data set D and one (step 510).

To determine the effect of the smoothing in object space, one projects the goodness-of-fit factors $GOF_D$ backward into object space (step 520). This results in goodness-of-fit factors $GOF_O$ in object space. These goodness-of-fit factors $GOF_O$ are then multiplied by the entries of the delta object $\Delta_D$ (step 530). One can smooth the results using the current pixon kernel function (step 540) as identified by the kernel pointer kdx from the kernel function table F. The ultimate output is a set of goodness-of-fit values $GOF_{kdx}$ for the iteration corresponding to the value of the kernel pointer kdx. Each of the goodness-of-fit values $GOF_{kdx}$ is used to determine whether a broader kernel function should be tested for the corresponding object point (step 310). Thus, the goodness-of-fit value $GOF_{kdx}$ for an object point can be considered as a criterion to select a pixon kernel 'function for this object point (see FIG. 2).

Pixon Map Update

Figure 6:
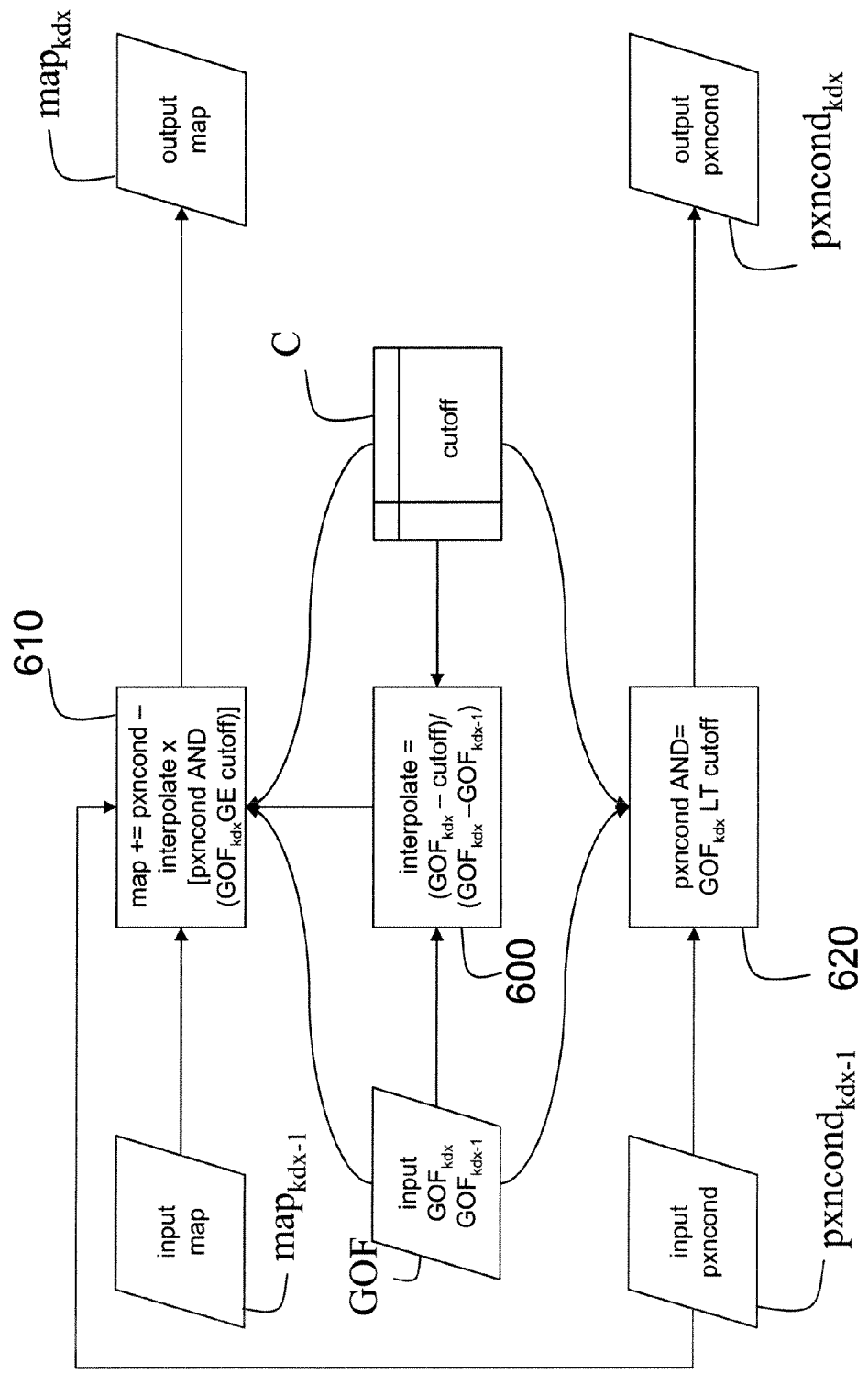
FIG. 6 is a flowchart of an exemplary map update for a pixon kernel function.

As discussed in connection with FIG. 3, FIG. 6 shows details of carrying out the single-kernel map update (step 320). As shown in FIG. 6, the single-kernel map update 320) includes comparing the goodness-of-fit values $GOF_{kdx}$ with a cut-off C and updating the pixon map P for object points that have a goodness-of-fit value for the iteration beyond the cut-off C. For such object points, one assigns a value to the pixon map P that corresponds to an interpolation between a pixon kernel function that most recently failed to result in an acceptable goodness-of-fit value and the last pixon kernel function that resulted in an acceptable goodness-of-fit value.

Thus, in the single-kernel map update (step 320), one calculates an interpolation value interpolate for each of the object points. The interpolation value interpolate is defined as the ratio of the difference between the goodness-of-fit value $GOF_{kdx}$ and the cut-off C and the difference between the two most recent goodness-of-fit values $GOF_{kdx}$ and $GOF_{kdx-1}$ (step 600). To update of the pixon map field, $map_{kdx-1}$, one increases each of its values by the corresponding value of the condition field pxncond, and, if the corresponding goodness-of-fit value passed the cut-off C, one reduces the value additionally by the interpolation value interpolate (step 610). This results in the updated pixon map field, $map_{kdx}$.

Within the single-kernel map update (step 320), the condition field, pxncond, is also updated. For object points that had a goodness-of-fit value that passed the cut-off C, the updated value of the condition field $pxncond_{kdx}$ is set to zero. For object points with goodness-of-fit values lower than the cut-off C, the updated value of the condition field $pxncond_{kdx}$ stays equal to one (step 620).

During the construction of the pixon map P, the values of the pixon map field, map, are increased for every tested kernel function until the goodness-of-fit value exceeds the cut-off C. Then, for these object points the pixon condition field, pxncond, is modified to indicate that the object points no longer participate in the pixon map construction process.

The cut-off C represents a tradeoff between noise and image quality. If one sets the cut-off C too high, over-smoothing will occur; if one sets the cut-off C too low, the image will show avoidable noise features. The output of the single kernel map update (step 320) is an update of the pixon map $P_{kdx}$ and the condition field $pxncond_{kdx}$. The next step will consider the next pixon kernel function with a new kernel pointer kdx.

In some practices, the calculation of goodness-of-fit (step 310) uses architecture similar to that used in an ordered subset expectation maximization algorithm (OSEM algorithm) that can be used for the iterative reconstruction of PET or SPECT data. The OSEM algorithm is described in H. M. Hudson and R. S. Larkin, "Accelerated image reconstruction using ordered subsets of projection data," IEEE Transactions on Medical Imaging, vol. 13, no. 4, pp. 601-609, 1994, the contents of which are herein incorporated by reference. The use of the OSEM algorithm enables a map determination to be done on the same or only slightly modified, reconstruction architecture. Thus, existing subroutines can be used.

Sequential Pixon Smoothing

In FIG. 7, pixon smoothing is applied sequentially to a standard reconstruction algorithm. Examples of reconstruction algorithms include iterative image reconstruction methods, such as maximum likelihood, non-negative least square or OSEM algorithms, which iteratively fit image models to the data. An overview of different reconstruction methods is given in R. C. Puetter et al., "Digital Image Reconstruction: Deblurring and Denoising," Annu. Rev. Astro. Astrophys., 2005, 43: 139-194, the contents of which are herein incorporated by reference. Another approach is the above mentioned OSEM algorithm. Within the OSEM algorithm, an iteration step is defined as a single pass through a set of data subsets. For each data subset, one uses the current estimate to initialize the application of the expectation maximization.

Using a standard reconstruction algorithm, the 3D input object $\psi$ is fitted to a measured data set D (step 700). In accordance with the above discussed use of the pixon kernel operator K, the resulting estimate of the 3D object is called a pseudo-object ψ'. One then calculates the pixon map P using the pseudo-object ψ' and the measured data set D (step 710). The pseudo-object ψ' is also the initial object for the pixon smoothing operation (step 720), which will be described in more detail in connection with FIGS. 8 and 9. During the pixon smoothing operation (step 720), one smoothes each object point of the pseudo-object ψ' over a pixon kernel function.

Figure 8:
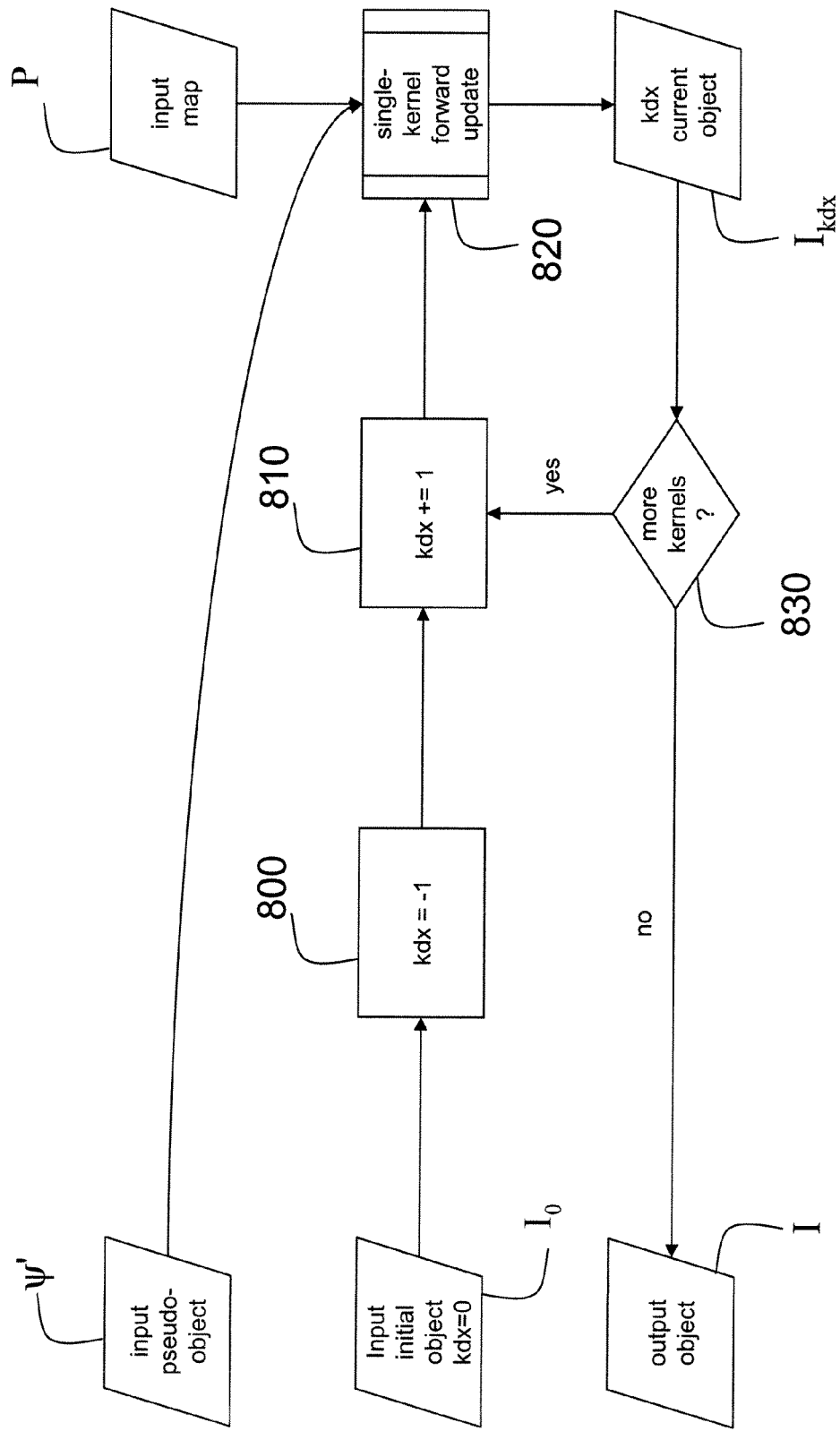
FIG. 8 is a flowchart illustrating a pixon smoothing operation.

FIG. 8 illustrates a forward pixon smoothing operation of the pseudo-object ψ'. Using the pixon map P, one builds a smoothed image by smoothing each object point with the pixon kernel function that is assigned to that object point in the pixon map P. The smoothed image is composed by smoothing the pseudo-object ψ' iteratively with the pixon kernel functions indicated in the pixon map P. For the first step, one prepares a kernel pointer kdx (indicating the kernel function) and an initial image object $I_0$ (steps 800 and 810). The initial image object $I_0$ has the dimension of the image object and only data points with value zero. The kernel pointer kdx and the initial image object $I_0$ are provided to a single-kernel function forward update (step 820). The pseudo-object ψ' and the pixon map P are also input parameters to the single-kernel forward update (step 820). Output parameters of the single-kernel forward update (step 820) are the unchanged kernel pointer kdx and an updated image object $I_{kdx}$. At the end of each iteration, one determines whether another pixon kernel function update is necessary (step 830), in which case the kernel pointer kdx needs to be increased (step 810), or whether all kernel functions have been considered, in which case one assigns the updated image object $I_{kdx}$ to be the final 3D image object I.

Figure 9:
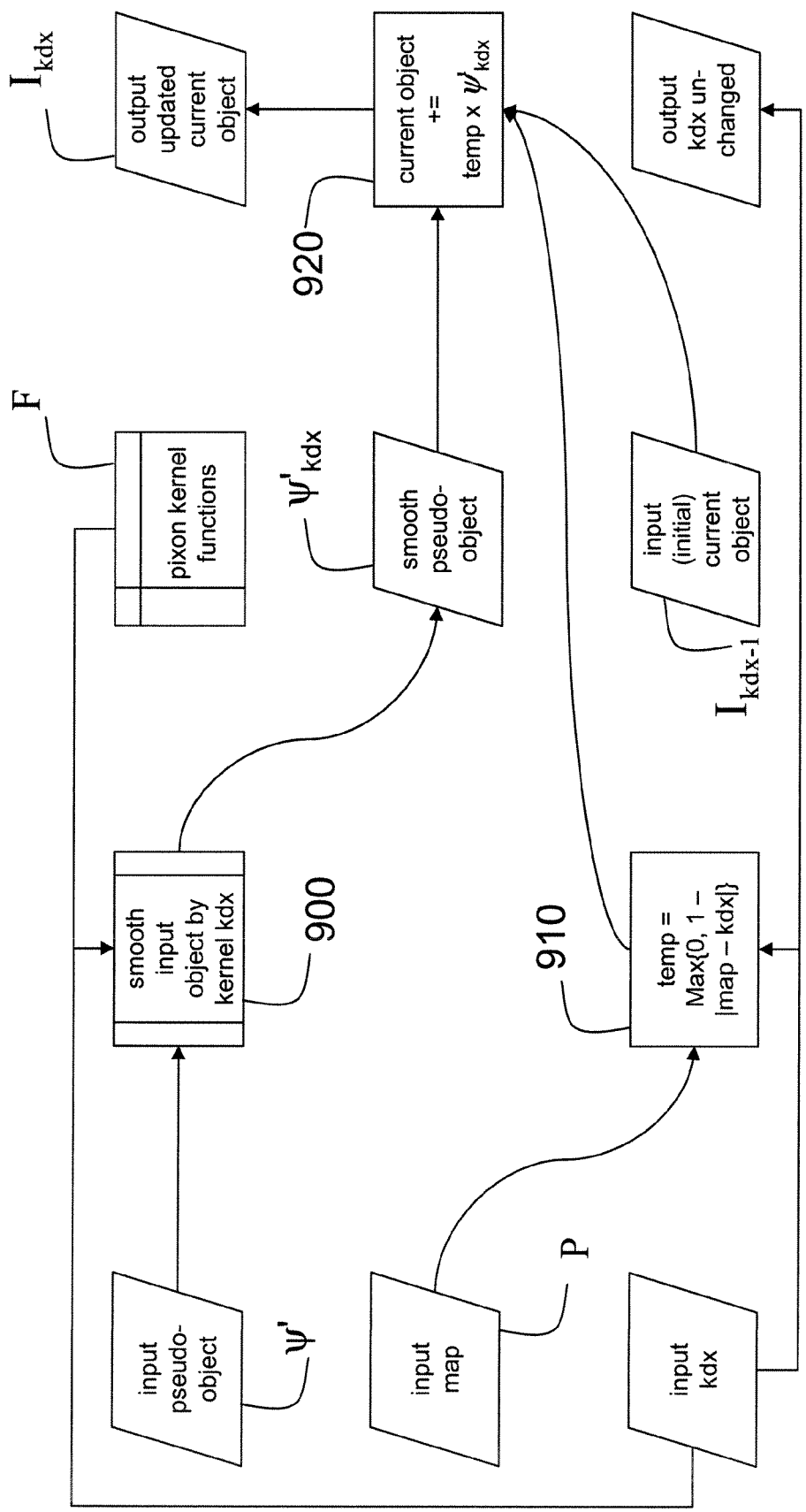
FIG. 9 is a flowchart illustrating a single-kernel function update during the pixon smoothing operation.

FIG. 9 shows, in detail, the steps in the single-kernel function update (step 820) of a preceding image object $I_{kdx-1}$ as discussed in connection with FIG. 8. The preceding image object $I_{kdx-1}$ comprises smoothed values for all object points for which the pixon map P indicated smoothing with pixon kernel functions identified by kernel pointers smaller than the current kernel pointer kdx. The pseudo-object ψ' is smoothed with the kernel function indicated by the current kernel pointer kdx. The result is a smoothed pseudo-object $ψ'_{kdx}$ (step 900). Then, one determines how much a data point is affected by the current kernel function (step 910). The corresponding calculation uses the pixon map P and the current value of the kernel pointer kdx to determine a temporary field temp, which is zero if the object point is not affected. The temporary field temp has values between 0 and 1 when two kernel functions are used for smoothing of the object point, and a value of 1 when only the current pixon kernel function is used for smoothing of the object point. For updating each affected object point of the image object $I_{kdx-1}$, one adds, to the current value of the image object $I_{kdx-1}$, the product of the values of the temporary field temp and of the smoothed pseudo-object $ψ'_{kdx}$ of that object point (step 920). The result is the updated image object $I_{kdx}$.

There exist a variety of ways to apply pixon smoothing. For example, pixon smoothing can be applied multiple times until the quality of a corresponding data model fulfills a stop-criterion that depends on the goodness-of-fit of the data model. Single or multiple pixon smoothing can be followed by standard reconstruction using the pixon smoothed object as an initial object for the reconstruction. Additionally, or as an alternative to pixon forward smoothing with the operator K, a backward pixon smoothing can be used to smooth the object with a transposed pixon operator $K^T$.

For many pixon smoothing operations, the pixon map P defines which of the pixon kernel functions are applied to an object point. The result of sequential pixon smoothing is an output object I, which is a reconstructed object that fulfills the additional constraints imposed by the pixon method.

Pixon Reconstruction Algorithm

Figure 10:
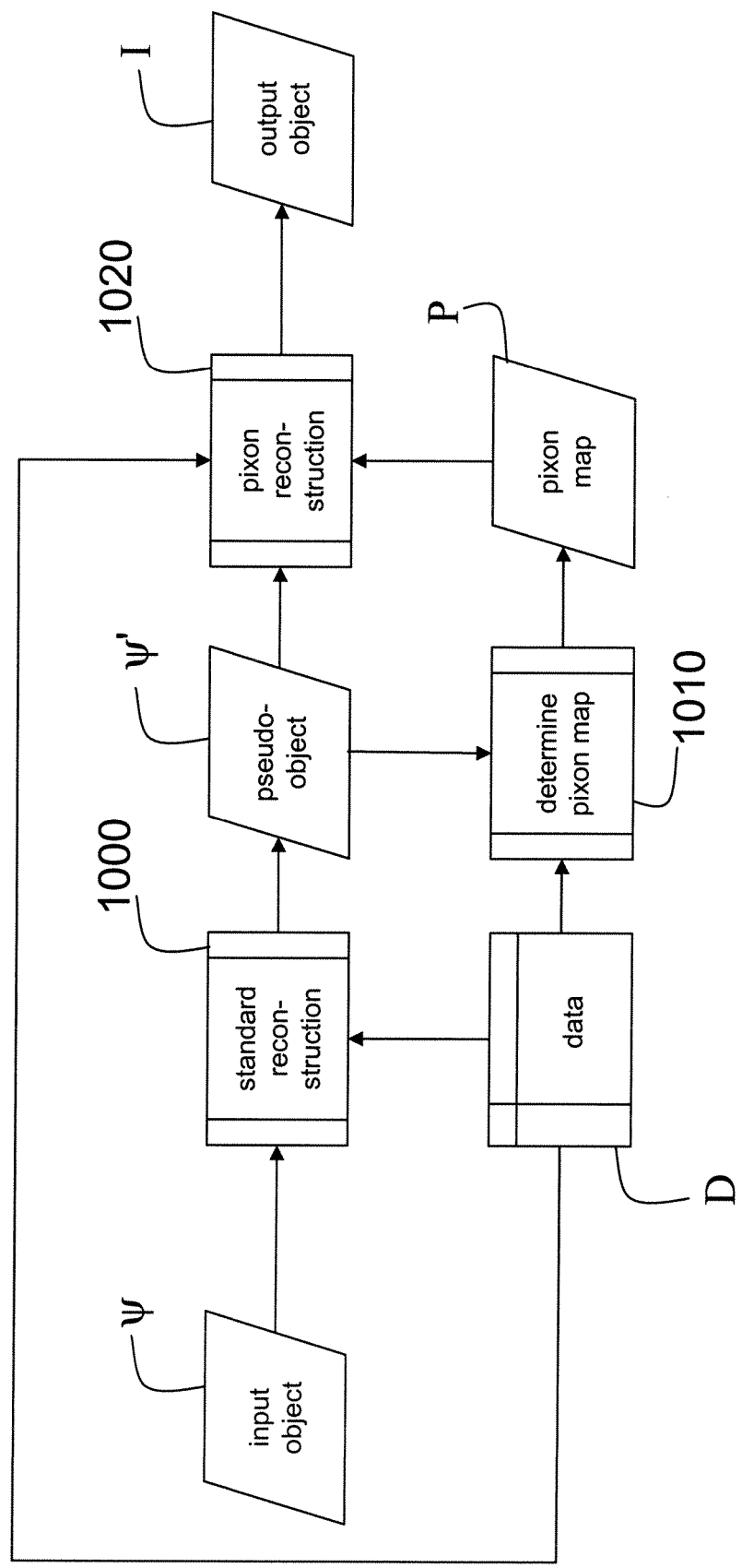
FIG. 10 is a flowchart illustrating a first example of image reconstruction using pixon reconstruction.

FIG. 10 illustrates sequential application of pixon reconstruction to a standard reconstruction algorithm. As for sequential pixon smoothing, a pseudo-object ψ' and a pixon map P are determined (steps 700 and 710). However, a pixon smoothing operation (step 720) is replaced with a pixon reconstruction (step 1020). The basis of pixon reconstruction (step 1020) is an iterative reconstruction algorithm that uses pixon smoothing operations within the iteration.

Examples of such pixon smoothing operations include application of a pixon operator K before a forward projection operation from object space into data space or application of a transposed pixon operator $K^T$ following a back-projection from data space into object space. The pixon smoothing operations can be integrated into conventional reconstruction algorithms, such as non-negative least square fits, or into reconstruction algorithms using subsets of the data set D, such as the OSEM algorithm.

Figure 11:
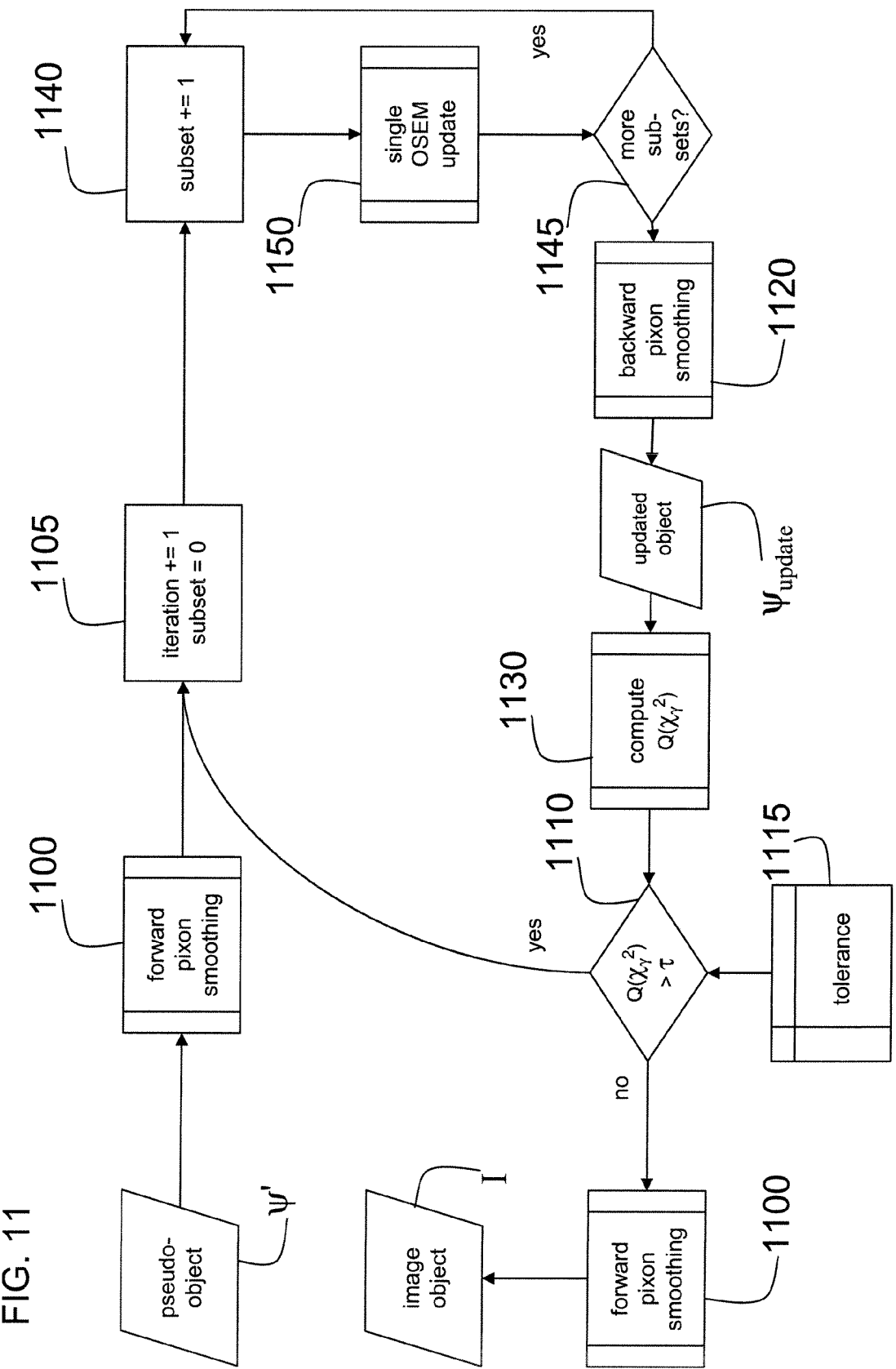
FIG. 11 is a flowchart illustrating pixon reconstruction based on an OSEM algorithm.

FIG. 11 illustrates, as an example, a pixon reconstruction algorithm based on an OSEM algorithm. Within the pixon reconstruction algorithm, a first pixon forward smoothing operation (step 1100) based on pixon operator K is applied to a pseudo-object ψ' before entering the iteration cycle (indicated by the increase of the increment iteration (step 1105)). A pixon forward smoothing operation of an updated object $ψ_{update}$ is applied after a comparison (step 1110) of a stop-criterion, $Q(χ_γ^2)$, with a threshold, τ, read from a tolerance table 1115. A pixon backward smoothing operation (step 1120) based on the transposed pixon operator $K^T$ is applied before calculating $Q(χ_γ^2)$ (step 1130).

Alternatively, or in addition, pixon forward smoothing operations can be applied before entering the subset iteration cycle (indicated by the increase of the increment subset (step 1140) and by the test of additional subsets (step 1145)) or, for a subset, before a single OSEM update (step 1150). Another pixon backward smoothing operation can be applied after the single OSEM update (step 1150).

Combined Pixon Map and Reconstruction Algorithm

Figure 12:
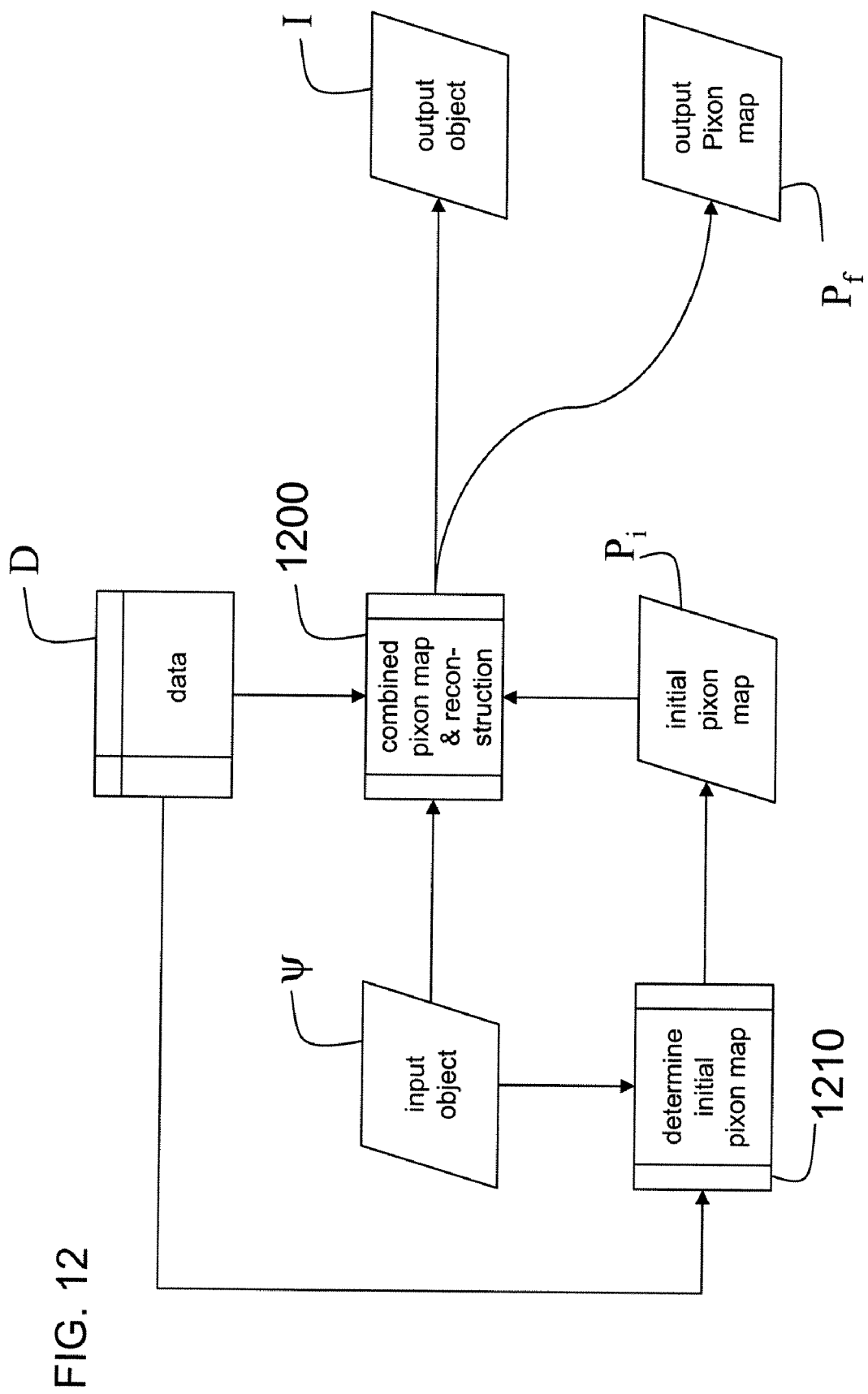
FIG. 12 is a flowchart illustrating a second example of image reconstruction using pixon reconstruction.

In FIG. 12, the pixon reconstruction and the standard reconstruction algorithm are combined into a combined pixon map and reconstruction algorithm that estimates the final 3D image object I based on a 3D input object ψ (step 1200). The 3D input object ψ is used to determine an initial pixon map $P_i$ (step 1210), which is used for applying the first pixon smoothing operation within the combined pixon map and reconstruction algorithm. Updated pixon maps are calculated within the algorithm (step 1200). An output of the combined pixon map and reconstruction algorithm (step 1200) is a final pixon map $P_f$, which indicates the pixon kernel functions used for the last smoothing operation. This final pixon map $P_f$ is provided, together with the final image object I, as an output.

A number of embodiments have been described. Nevertheless, it will be understood that various modifications may be made without departing from the spirit of the invention described by the appended claims. For example, instead of being supplied to a renderer for visualization, the output object can be supplied to a record keeping system (e.g., PACS system) or a system for automatic quantitative diagnosing.

As the pixon method is an (image) reconstruction method that can be applied in different technological fields, a pixon map can be constructed based on data sets measured in astronomy, in communication technology, material science or medical imaging. Even though 3D reconstruction was discussed in detail, the pixon map can be constructed based on a data set for reconstructing 2D, 3D or higher dimensional objects. Accordingly the dimension of the object space may be 2D, 3D or of a higher dimension.

The order in which the different pixon kernel functions are tested can be varied, the step size can be varied, or some pixon kernel functions may be considered only in defined areas of the image.

The table F of the pixon kernel function may comprise, for example, ten spherical kernel functions. If one does not want to impose symmetry, one may use additionally or alternatively elliptical pixon kernel functions. However, asymmetric kernel functions may increase the computational effort, which one can handle, for example, by using specifically designed hardware.

The pixon map P can be provided, for example, as a field of variables defining the pixon kernel functions or as a field of indices, which indicate kernel functions within the table F of the pixon kernel functions.

When determining the pixon map P for, e.g., a Poisson data set D, various statistical evaluations can be used to determine the effect of the pixon smoothing operation with a selected pixon kernel function. For example, alternatively to the Mighell weight discussed in connection with FIG. 15 (step 510), a value of the delta data model $\Delta_M$ could be divided by Mighell-like statistical weights, such as the sum of the corresponding value of the data set D and a statistical-data-offset number with. Examples for Mighell-like statistical weight include a statistical-data-offset numbers between 0 and 20, between 0.1 and 10, between 0.5 and 5, or equal to 0.3, 0.5, 0.75, 1, 1.25, 1.5, 1.75, 2, 3, 4 and 5. Alternatively, one can employ within a Mighell-like statistical weight a condition such as dividing the delta data model $\Delta_M$ by the corresponding value of the data set or the sum of the corresponding value of the data set and the statistical-data-offset number, only if the condition is fulfilled that the value of the data set D is greater than some threshold, for example greater than 0. If the condition is not fulfilled one uses the value zero for that data point.

Various combinations of the pixon methods described referring to FIGS. 7 to 12 can be employed. The pixon smoothing operation may include the calculation of an average of the values of the object points within the volume defined by the corresponding pixon kernel function.

It is to be further understood that, because some of the constituent system components and method steps depicted in the accompanying figures can be implemented in software, the actual connections between the systems components (or the process steps) may differ depending upon the manner in which the disclosed method is programmed. Given the teachings provided herein, one of ordinary skill in the related art will be able to contemplate these and similar implementations or configurations of the disclosed system and method.

For example, the numerical and symbolic steps described herein can be converted into a digital program executed, e.g., on a digital signal processor according to methods well known in the art. The digital program can be stored on a computer readable medium such as a hard disk and can be executable by a computer processor. Alternatively, the appropriate steps can be converted into a digital program that is hardwired into dedicated electronic circuits within the compressor that executes the steps. Methods for generating such dedicated electronic circuits based on a given numerical or symbolic analysis procedure are also well known in the art.

Accordingly, other embodiments are within the scope of the following claims.

What is claimed is:

1. A method for determining a pixon map for pixon smoothing of an object based on a data set, the method comprising:
    receiving the data set;
    receiving an input object associated with the data set;
    determining, in a series of steps, statistical objects for a set of pixon kernel functions, wherein each step includes
        selecting a pixon kernel function from the set of pixon kernel functions,
        smoothing the input object on the basis of the selected pixon kernel function, thereby creating a smoothed object, and
        determining the statistical object for the selected pixon kernel function on the basis of the smoothed object, the data set, and a Mighell-like statistical weight;
    determining contributions of the pixon kernel functions to the pixon map based on the statistical objects; and
    assigning values to the pixon map corresponding to the contributions of the pixon kernel functions.

2. The method of claim 1, wherein the statistical objects are further determined on the basis of the input object.

3. The method of claim 1, wherein determining the contributions of the pixon kernel functions includes determining a first pixon kernel function for an object point of the input object, the first pixon kernel function being the broadest pixon kernel function available in the set of pixon kernel functions for which a value of the statistical object at the object point is inside the limitation of a pre-set cut-off.

4. The method of claim 3, wherein one of the values of the pixon map corresponding to the object point includes a contribution of the first pixon kernel function to the pixon smoothing of that object point.

5. The method of claim 3, wherein determining the contributions of the pixon kernel functions includes determining a second pixon kernel function for the object point, the second pixon kernel function being the narrowest pixon kernel function from the set of pixon kernel functions for which the value of the statistical object at the object point is outside the limitation of a pre-set cut-off value.

6. The method of claim 5, wherein one of the values of the pixon map is based on contributions of the first and second pixon kernel functions such that pixon smoothing of an object point with the first pixon kernel function and with the second pixon kernel function and adding the resulting smoothed values according to the contributions corresponds to a pixon smoothing operation with a determinable statistical object value equal to the pre-set cut-off value.

7. The method of claim 1, wherein determining statistical objects further comprises
    determining a delta object by subtracting the input object from the smoothed object;
    determining a delta data model by projecting the delta object from object space into data space;
    determining statistical data factors by evaluating the delta data model using the data set and the Mighell-like statistical weight;
    determining statistical object factors by back-projecting the statistical data factors from data space into object space; and
    determining the statistical object by multiplying the entries of the delta object by the corresponding statistical object factors.

8. The method of claim 7, wherein determining statistical data factors includes setting the sum of the value of the data set at the data point and a statistical-data-offset number as Mighell-like statistical weight and dividing a value of the delta data model at one of the data points of the data set by the sum of the value of the data set at the data point and a statistical-data-offset number.

9. The method of claim 8, wherein the statistical-data-offset number is selected to be a number between 0 and 10.

10. The method of claim 7, wherein determining statistical data factors includes determining that the measured value of a data set is above a threshold and determining the associated statistical data factor by evaluating the delta data model using the data set and the Mighell-like statistical weight.

11. The method of claim 7, wherein determining statistical data factors includes determining that the measured value of a data set is below a threshold and setting the associated statistical data factor to a pre-set value.

12. The method of claim 7, wherein determining statistical objects further includes smoothing the statistical object factors on the basis of the selected pixon kernel function before the multiplication with the delta object.

13. The method of claim 1, wherein, during the series of steps, pixon kernel functions are selected in order of increasing sizes.

14. The method of claim 1, further comprising selecting the pixon kernel functions from the group consisting of symmetrical, spherical, and elliptical pixon kernel functions, and pixon kernel functions based on the delta-functions, a Gaussian function, an inverted paraboloid, and a function $f(x;\beta)=(1+\beta x^2)^{-1/\beta^2}$.

15. The method of claim 1, further comprising determining the statistical object on the basis of a chi-square-gamma statistic.

16. The method of claim 1, further comprising fitting the input object to the data using a reconstruction algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

17. The method of claim 1, further comprising receiving the data set from a nuclear imaging system.

18. A method for determining a pixon map entry for a first pixon kernel function of a set of pixon kernel functions having different sizes, the method comprising:
  receiving a data set;
  receiving an input object associated to the data;
  smoothing the input object based on the first pixon kernel function, thereby creating a smoothed object;
  determining a delta object by subtracting the input object from the smoothed object;
  determining a delta data model by projecting the delta object from object space into data space;
  determining statistical data factors by evaluating the delta data model using the data and a Mighell-like statistical weight;
  determining statistical object factors by back-projecting the statistical data factors from data space into object space;
  multiplying the entries of the delta object by the corresponding statistical object factors, thereby creating a statistical object;
  determining an object point for which a value of the statistical object at the object point has transitioned from being outside the limitation of a pre-set cut-off value to being inside the limitation;
  selecting the next smaller pixon kernel function compared to the first pixon kernel function to contribute to an entry of the pixon map corresponding to the object point.

19. A nuclear imaging device comprising:
  a detector unit for detecting radiation emitted from within a patient and providing a data set indicative of the detected radiation,
  a pixon map construction unit for creating a pixon map based on a set of pixon kernel functions and a Mighell-like statistical weight;
  a pixon reconstruction unit for reconstructing an image using a pixon smoothing operation based on the pixon map.

20. The nuclear imaging device of claim 19, wherein the pixon map construction unit is configured to analyze an effect of pixon smoothing with a pixon kernel function on an input object by determining a statistical object based on the smoothed object and the Mighell-like statistical weight.

21. The nuclear imaging device of claim 20, wherein the pixon map construction unit is configured for
  determining a delta object by subtracting the input object from the smoothed object;
  determining a delta data model by projecting the delta object from object space into data space;
  determining statistical data factors by evaluating the delta data model using the data set and the Mighell-like statistical weight;
  determining statistical object factors by back-projecting the statistical data factors from data space into object space;
  determining the statistical object by multiplying the entries of the delta object by the corresponding statistical object factors.

22. The nuclear imaging device of claim 19, wherein the detector unit includes a positron emission tomography detector system.

23. The nuclear imaging device of claim 19, wherein the detector unit includes a single photon computed tomography detector system.

24. The nuclear imaging device of claim 19, wherein the pixon reconstruction unit is configured to run an algorithm selected from the group consisting of algorithms based on maximum likelihood, algorithms based on an ordered subset expectation maximization, algorithms based on a non-negative least square fit, algorithms based on an ordered subset non-negative least square fit, and algorithms based on a pixon method.

25. A non-transitory computer readable medium having included software thereon, the software including instructions to determine a pixon map for pixon smoothing, the instructions comprising:
  receiving the data set;
  receiving an input object associated to the data set;
  determining, in a series of steps, statistical objects for a set of pixon kernel functions, wherein each step includes
    selecting a pixon kernel function from the set of pixon kernel functions,
    smoothing the input object on the basis of the selected pixon kernel function, thereby creating a smoothed object, and
    determining the statistical object for the selected pixon kernel function on the basis of the smoothed object, the data set, and a Mighell-like statistical weight;
  determining contributions of the pixon kernel functions to the pixon map based on the statistical objects; and
  assigning values to the pixon map corresponding to the contributions of the pixon kernel functions.

* * * * *